US011101765B1

United States Patent
Lehman et al.

(10) Patent No.: US 11,101,765 B1
(45) Date of Patent: Aug. 24, 2021

(54) HIGH TEMPERATURE INVERTER

(71) Applicant: Paragon Products, LLC, El Dorado Hills, CA (US)

(72) Inventors: Alvin Arthur Lehman, Folsom, CA (US); Zeljko Marin, Citrus Heights, CA (US)

(73) Assignee: Paragon Products, LLC, El Dorado Hills, CA (US)

( * ) Notice: Subject to any disclaimer, the term of this patent is extended or adjusted under 35 U.S.C. 154(b) by 60 days.

(21) Appl. No.: 16/774,364

(22) Filed: Jan. 28, 2020

(51) Int. Cl.
| | | |
|---|---|---|
| *H02P 29/60* | (2016.01) | |
| *H02P 29/02* | (2016.01) | |
| *H02P 27/08* | (2006.01) | |
| *H02P 29/024* | (2016.01) | |
| *F04B 17/03* | (2006.01) | |
| *H05B 45/00* | (2020.01) | |

(52) U.S. Cl.
CPC .............. *H02P 29/60* (2016.02); *F04B 17/03* (2013.01); *H02P 27/08* (2013.01); *H02P 29/027* (2013.01); *H02P 29/0241* (2016.02); *H05B 45/00* (2020.01)

(58) Field of Classification Search
CPC ........ H02P 27/08; H02P 29/032; H02P 29/02; H02P 29/60
See application file for complete search history.

(56) References Cited

U.S. PATENT DOCUMENTS

| | | | | |
|---|---|---|---|---|
| 5,285,145 | A * | 2/1994 | Minowa | H02P 21/00 318/808 |
| 6,784,634 | B2 * | 8/2004 | Sweo | H02P 9/007 290/46 |
| 8,707,932 | B1 | 4/2014 | Marin | |
| 10,027,261 | B2 * | 7/2018 | Ishikawa | F04D 29/661 |
| 2009/0187326 | A1 * | 7/2009 | Rozman | H02P 21/0003 701/103 |
| 2010/0066288 | A1 * | 3/2010 | Williams | B60L 50/51 318/434 |

* cited by examiner

*Primary Examiner* — Thai T Dinh
(74) *Attorney, Agent, or Firm* — Weintraub Tobin

(57) ABSTRACT

An inverter system and method for driving an alternating current induction motor connected to a fluid transfer pump, including PWM control of power switching devices and fast-acting shutdown circuitry to disable the power switching devices when unintended or unexpected conditions are detected. The inverter system further includes start/stop safety logic, fault current detection and a fast acting current limit circuit incorporating a programmable current limit, operational status and parameter monitoring and communication, visual signalization, locked rotor detection, and the ability to incorporate closed loop control and remote operation into systems while they are in service.

20 Claims, 15 Drawing Sheets

HIGH TEMPERATURE INVERTER

FIELD OF THE INVENTION

This invention relates generally to an inverter system and method for driving a fluid transfer pump in internal combustion engines for improving reliability and performance.

BACKGROUND OF THE INVENTION

Internal combustion engines utilize pumps to supply a variety of fluids. For example, engines for locomotives and other heavy diesel electric applications require pumps to provide fuel to the fuel injection system. Pumps used in these applications must meet stringent reliability requirements over long service lives in adverse environments. These environments often include temperature extremes, mechanical shock and vibration, input voltage spikes and sags, dry run conditions, and contamination in the fuel. Additionally, the pumps must operate reliably over a wide range of duty cycles, from the pump being on 100% of the time to intermittent duty cycles where the pump has frequent starts and stops. The ranges of environmental and operational conditions the pumps experience in the field are extremely varied and unpredictable. Accordingly, operational requirements provided to the pump supplier do not always capture conditions that may lead to reliability issues.

The pump must also be able to operate with the engine off and is required to provide fluid, such as fuel, to the engine independent of engine speed. One solution is to utilize an electric motor to drive the pump, such as an alternating current (AC) induction motor (IM), which has many advantages over other common motor types. For example, an AC induction motor, or ACIM, has significantly longer life than other common motor types and has relatively low cost. However, because the available electrical power on these engine systems is often of the direct current (DC) type, an inverter is required to convert the DC electrical power into an alternating voltage source that can drive the AC induction motor.

The inverter can be one of the most highly stressed components of a system using an AC induction motor to drive a fluid transfer pump. A power switching device is a critical component of the inverter. Arrays of these power switching devices are used to control the phasing of the electrical power to a three phase AC induction motor. Without robust protections, the power switching devices can experience failures due to environmental and operational extremes.

A variety of conditions can result in high current in the power switching devices, either continuously or intermittently. Clogged fuel filters downstream of the pump outlet can result in high outlet pressure. Debris in the fuel can cause load spikes as it passes through the pump. The high current conditions result in elevated power switching device temperatures that reduce the life of the power switching devices. Current spikes gradually degrade the power switching devices and can eventually lead to failure. The transient nature of current spikes makes them extremely difficult to protect against.

A microcontroller, such as a DSP microcontroller, can be programmed to limit current, but the microcontroller will be slower to respond than desired due to the need to convert the analog current signal to a digital signal. Additionally, it takes time for the microcontroller to evaluate and act upon the inputs. Therefore, one of the drawbacks of a conventional approach that uses a microcontroller programmed to limit current is that it does not respond fast enough when high current conditions occur. Therefore, it is desirable that there be a fast-acting circuit for limiting current.

In order to provide highly reliable inverter operation and extended lifetime, it is imperative to ensure that the power switching devices remain operational not only within normal power supply ranges, but also during startup and shutdown scenarios. These events can include unplanned power excursions. Under normal operating conditions, the microcontroller and associated circuitry provide controlled processes for startup and shutdown. However, in the event that unintended or unexpected conditions are encountered, the microcontroller firmware is not capable of acting fast enough to adequately protect the power switching devices. Therefore, a fast-acting start/stop safety circuit is needed for startup and shutdown under unintended or unexpected conditions.

In addition, there is a need for an improved technique for lock rotor detection.

For the foregoing reasons, there is a need to overcome one or more of these shortcomings while also incorporating one or more of these desirable features.

BRIEF SUMMARY OF THE INVENTION

In general, the subject of this invention is an inverter system and method for driving a fluid transfer pump, such as a fuel pump, in internal combustion engines.

According to various embodiments, the disclosed inverter system includes features for monitoring and communicating operational status and conditions for improving reliability and performance. This functionality provides information about the pump's environment. These innovative features include start/stop safety logic, fault current detection and a fast acting current limit circuit incorporating a programmable current limit, operational status and parameter monitoring and communication, visual signalization, and the ability to incorporate closed loop control and remote operation into systems while they are in service.

The disclosed inverter system includes innovative features that improve functionality and reliability, including the ability to ensure that the power switching devices are optimally protected throughout operation, including during startup scenarios, shutdown scenarios, and unplanned power excursions. These features allow monitoring and communicating operational status and conditions, which provides information about the pump's environment that can be used to improve functionality, improve reliability, and assist with trouble shooting.

Accordingly, one embodiment of the present invention overcomes one or more of the shortcomings of the known prior art by providing an inverter and motor system for driving a fluid transfer pump comprising a main power supply for providing a main voltage level, an alternating current induction motor comprising a rotor and a stator with three coils, and an inverter system.

In this embodiment, the inverter system further comprises a microcontroller connected to a memory; a first current measurement circuit comprising a current transducer; a power switching circuit connected to the stator comprising a plurality of power switching devices arranged as a plurality of power switching device pairs, each of the plurality of power switching device pairs comprising a high-side power switching device and a low-side power switching device connected to the high-side power switching device; a current limit circuit comprising a comparator connected to the first current measurement circuit and to a current limit reference, a flip-flop connected to the comparator and to a reset signal from the microcontroller, and a tri-state buffer connected to a current limit enable signal from the microcontroller and connected to the flip-flop; a first power supply for providing a first voltage level to the power switching circuit; a second power supply for providing a second voltage level to the microcontroller; and a power supply monitoring circuit wherein the power supply monitoring circuit determines whether the first voltage level is within a first range, the second voltage level is within a second range, and the main voltage level is within a third range.

In other aspects of this embodiment, the plurality of power switching devices may comprise transistors. In other aspects of this embodiment, exactly one of the power switching devices in each of the plurality of power switching device pairs can be ON in each step of a six step switching cycle. In other aspects of this embodiment, the parameter monitoring circuit can comprise a voltage measurement circuit having a voltage measurement circuit output connected to the microcontroller, wherein the microcontroller stores information in the memory related to the voltage measurement circuit output; a second current measurement circuit having a second current measurement circuit output connected to the microcontroller, wherein the microcontroller stores information in the memory related to the second current measurement circuit output; and a temperature measurement circuit having a temperature measurement output connected to the microcontroller, wherein the microcontroller stores information in the memory related to the temperature measurement circuit output. In other aspects of this embodiment, the three coils of the stator can be delta connected. In other aspects of this embodiment, the first power supply can comprise a 13.5 volt power supply. In other aspects of this embodiment, the second power supply can comprise a 3.3 volt power supply. In other aspects of this embodiment, the power supply monitoring circuit can comprise a first window comparator connected to the main power supply and having a first digital output; a second window comparator connected to the first power supply and having a second digital output; a third window comparator connected to the second power supply and having a third digital output; and at least one logic gate connected to the first digital output, the second digital output, and the third digital output. In other aspects of this embodiment, the temperature measurement circuit can comprise a thermistor. In other aspects of this embodiment, the voltage measurement circuit can comprise a low pass filter and buffer. In other aspects of this embodiment, the second current measurement circuit can comprise a second current transducer. In other aspects, this embodiment can further comprise a first light emitting diode and a second light emitting diode. In other aspects of this embodiment, the first light emitting diode can comprise a green light emitting diode and the second light emitting diode can comprise a yellow light emitting diode. In other aspects of this embodiment, the microcontroller can be configured to cause the yellow light emitting diode to blink to indicate a locked rotor condition when the current limit reference is exceeded for a plurality of six step switching cycles.

Another embodiment of the present invention overcomes one or more of the shortcomings of the known prior art by providing an inverter system for driving an alternating current induction motor comprising a microcontroller connected to a memory; a first current measurement circuit comprising a current transducer; and a power switching circuit outputting a three-phase switching pattern for driving an alternating current induction motor.

In this embodiment, the power switching circuit comprises a plurality of power switching devices arranged as a plurality of power switching device pairs with each of the plurality of power switching device pairs comprising a high-side power switching device and a low-side power switching device connected to the high-side power switching device; a current limit circuit comprising a comparator connected to the first current measurement circuit and to a current limit reference, a flip-flop connected to the comparator and to a reset signal from the microcontroller, and a tri-state buffer that is connected to a current limit enable signal from the microcontroller and connected to the flip-flop and disables the power switching circuit while the current limit reference is exceeded; a first power supply for providing a first voltage level to the power switching circuit; a second power supply for providing a second voltage level to the microcontroller; a power supply monitoring circuit wherein the power supply monitoring circuit determines whether the first voltage level is within a first range and the second voltage level is within a second range; and a parameter monitoring circuit comprising a voltage measurement circuit having a voltage measurement circuit output connected to the microcontroller wherein the microcontroller stores information in the memory related to the voltage measurement circuit output, a second current measurement circuit having a second current measurement circuit output connected to the microcontroller wherein the microcontroller stores information in the memory related to the second current measurement circuit output, and a temperature measurement circuit having a temperature measurement output connected to the microcontroller wherein the microcontroller stores information in the memory related to the temperature measurement circuit output.

In other aspects of this embodiment, each of the plurality of power switching devices can comprise a transistor. In other aspects of this embodiment, exactly one of the power switching devices in each of the plurality of power switching device pairs can be ON at each step in a six step switching cycle. In other aspects of this embodiment, the power supply monitoring circuit can comprise a first window comparator connected to the first power supply having a first digital output; a second window comparator connected to the second power supply having a second digital output; and at least one logic gate connected to the first digital output and the second digital output. In other aspects of this embodiment, the temperature measurement circuit can comprise a thermistor; the voltage measurement circuit can comprise a low pass filter and buffer; and the second current measurement circuit can comprise a second current transducer.

Another embodiment of the present invention overcomes one or more of the shortcomings of the known prior art by providing a start motor method. Upon detection of a start motor request, the system determines whether the first power supply and second power supply are within their proper operational ranges. If the power supplies are within their proper operational ranges, it is determined whether the microcontroller has proper control over the power switching device drivers. If yes, initialization of registers in the microcontroller takes place for starting a six step switching process. After initialization is complete, the FIRE ENABLE signal is turned on, or activated, to turn on the power switching device drivers and the six step operation begins. After the power switching device drivers are turned on, the transistor operational frequency is adjusted according to the input voltage (i.e., V/Hz operation). At this point, the motor is operational.

Another embodiment of the present invention overcomes one or more of the shortcomings of the known prior art by providing a stop motor request. Upon detection of a stop motor request, the microcontroller acknowledges the stop motor request and ramps the current down to zero, followed by a stop of the V/Hz operation. Then the six step switching operation is stopped. After the six step switching operation is stopped, the registers in the microcontroller for the six step process are set for a no operation state, and the FIRE ENABLE signal is turned off. The microcontroller then updates the system status to indicate the motor has stopped.

Another embodiment of the present invention overcomes one or more of the shortcomings of the known prior art by providing a hardware current limiting initialization sequence. The microcontroller performs initialization for the hardware current limiting operation, and initializes interrupts and state values for use in current limiting. Then the microcontroller enables internal detection logic, which is used for fast turnoff of the power switching devices. The microcontroller then sends current limit programming bits to the current limit reference hardware. The output of the current limit reference hardware is used to compare against actual motor current determined by the current measurement circuit. Next, the microcontroller enables a hardware current limiting interrupt and a current limit circuit reset pulse. The current limiting operation will then be enabled by current above the programmed threshold.

Another embodiment of the present invention overcomes one or more of the shortcomings of the known prior art by providing a hardware current limiting operation sequence. The microcontroller sets the hardware current references for each start current profile step with the threshold value for comparison to the actual operational current. Then, a start mode timer is used to delay activation of the current limiting capability. In one embodiment, additional unique profile steps are run, each with their own unique current limit references. The microcontroller detects whether the last step of the start profile has been completed.

Another embodiment of the present invention overcomes one or more of the shortcomings of the known prior art by providing for certain operational monitoring steps of an inverter system. In one embodiment, data is updated every 60 seconds. The updates include updating a first life counter for total seconds powered on over the life of the pump, updating a second life counter for the seconds powered on since the last firmware flash, updating histogram data, including in one embodiment 8 main voltage bins, 8 main current bins, 8 cap voltage bins, and 8 transistor temperature bins. Further, data is added to the event log for events including, in one embodiment, power up failed, motor start failed, V/Hz disabled, Main Power Status (MPS) limp home, MPS disabled, bad ADC limp home, current too high/locked rotor, fault A/locked rotor, voltage too low to run, motor stopped/locked rotor, external clock failed, and software reset. Further, counters are updated if applicable events occur including, in one embodiment, successful start, unsuccessful start, low voltage, locked rotor, external clock fail, software reset, and/or brown out reset.

Another embodiment of the present invention overcomes one or more of the shortcomings of the known prior art by providing for a locked rotor condition to be detected. If the rotor stops turning completely or is significantly slowed down, such as by an obstruction within the pump, the motor current will rise significantly and trigger the current limiting operation. The inverter system counts the number of steps during which the current is limited. If the number of steps where the current is limited exceeds a continuous count threshold or a profile count threshold, then the rotor is considered locked, and the microcontroller will indicate a locked rotor condition.

In one example embodiment, when the current limit is exceeded for 240 consecutive steps, then the rotor is considered locked. In another embodiment, the repetition of a pattern of steps with the current limit exceeded over a longer period of time will indicate a locked rotor.

Other objects, features, and advantages of the present invention will become apparent upon consideration of the following detailed description and the accompanying drawings.

DETAILED DESCRIPTION OF THE INVENTION

The following is a detailed description of exemplary embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes, and are not intended to limit the scope of the claims.

Inverter System 100 and Pump 150

Figure 1:
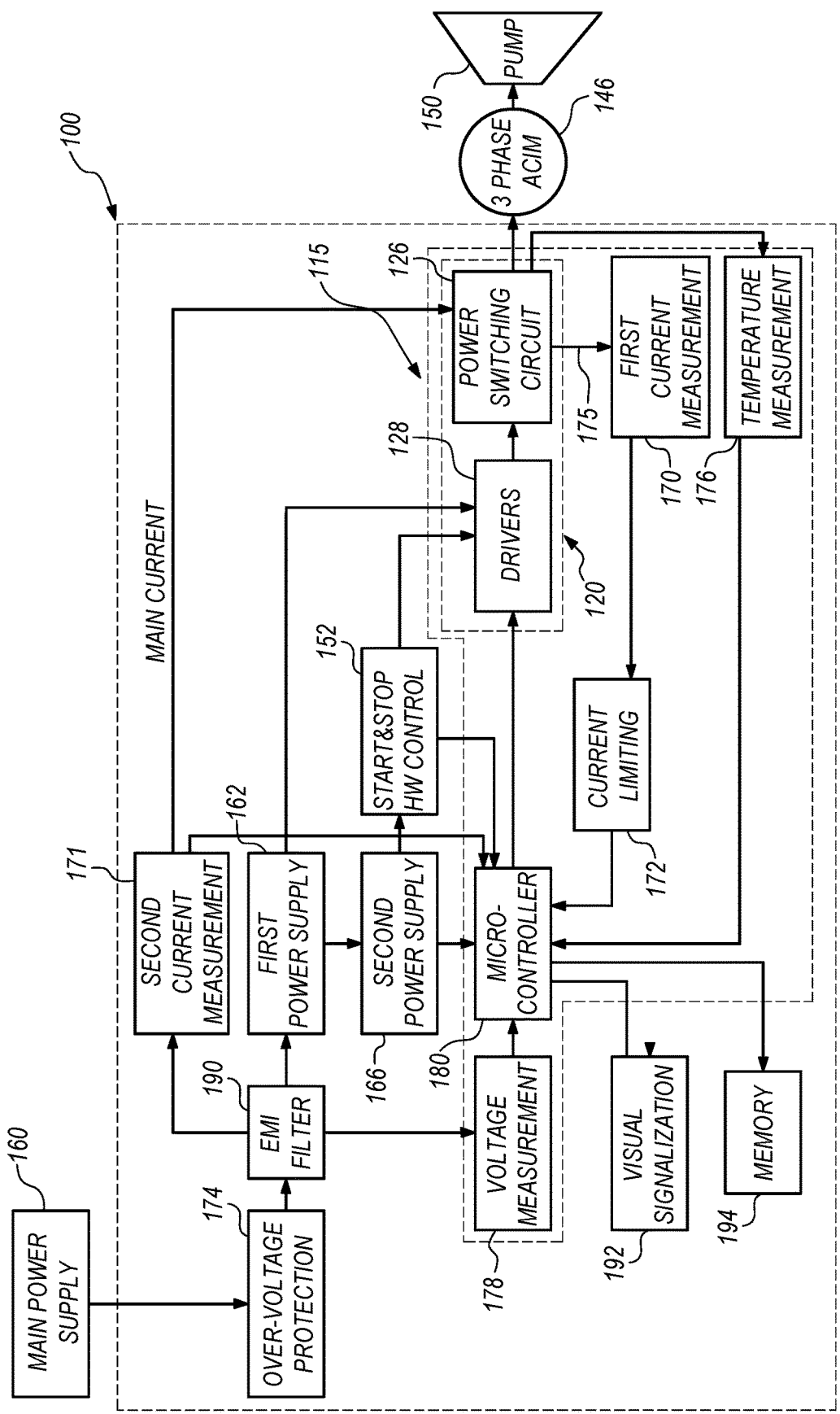
FIG. 1 illustrates a block diagram of an example inverter system.

FIG. 1 illustrates an example embodiment of an inverter system 100 comprising power switching device drivers 128, such as transistor drivers, a power switching circuit 126, a microcontroller 180, a first power supply 162, a second power supply 166, a start/stop safety logic circuit 152, a current limiting circuit 172, a first current measurement circuit 170, a second current measurement circuit 171, a temperature measurement circuit 176, a voltage measurement circuit 178, visual signalization 192, a memory 194, an EMI filter 190, and an overvoltage protection circuit 174. Inverter system 100 drives a fuel pump 150 via a three-phase AC induction motor 146.

In one embodiment, microcontroller 180 is a dsPIC33. In alternate embodiments other microcontrollers or microprocessors with accompanying circuitry can be used. In one embodiment, the first power supply 162 is a 13.5 volt power supply. However, in alternate embodiments, the first power supply 162 may provide a voltage that falls within the range of approximately 10 volts to 20 volts. In one embodiment, the second power supply 166 is a 3.3 volt power supply. However, in alternate embodiments, it may provide another voltage level as required by the circuitry in the inverter system. Further, additional power supplies may be added in alternate embodiments to supply voltage for circuits requiring different voltage levels.

In one embodiment, temperature measurement circuit 176 comprises a thermistor. In one embodiment, voltage measurement circuit 178 comprises a low pass filter and buffer to remove noise from the signal. The microcontroller 180 uses an analog to digital (A-to-D) converter to convert the analog signal output from the voltage measurement circuit 178 to a digital signal to determine the voltage. In one embodiment, first current measurement circuit 170 and second current measurement circuit 171, each comprise current transducers with isolated outputs, such as an ACS781.

Power Switching Circuit

Figure 2:
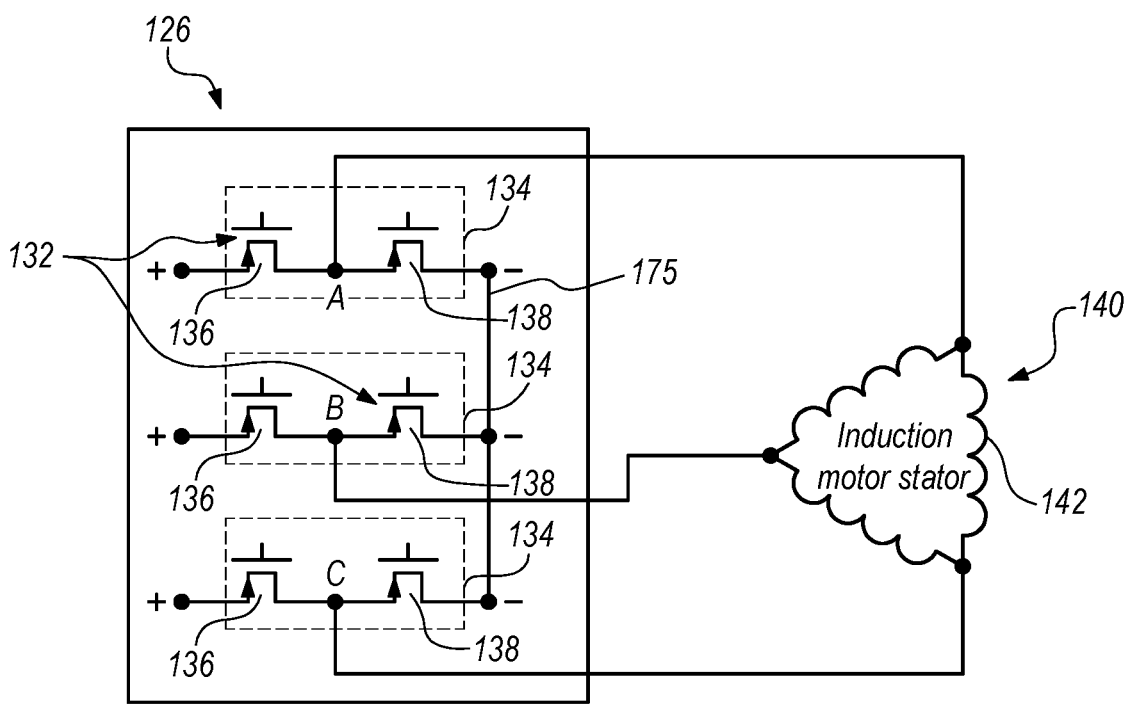
FIG. 2 illustrates an example power switching circuit and induction motor stator.

Referring to FIGS. 1 and 2, a power switching circuit 126 comprises a three phase transistor bridge in one embodiment. Power switching circuit 126 further comprises a plurality of power switching devices 132 for controlling the phasing of the electrical power to a three-phase AC induction motor 146. As shown in FIG. 1, in an exemplary embodiment, transistors, such as MOSFETs or IGBTs, are used as power switching devices 132. In alternate embodiments other types of transistors could be used. As shown in FIG. 2, the power switching devices 132 are arranged into power switching device pairs 134 wherein each power switching device pair 134 comprises a high-side power switching device 136 connected to a low-side power switching device 138.

Motor Stator 140

Figure 3:
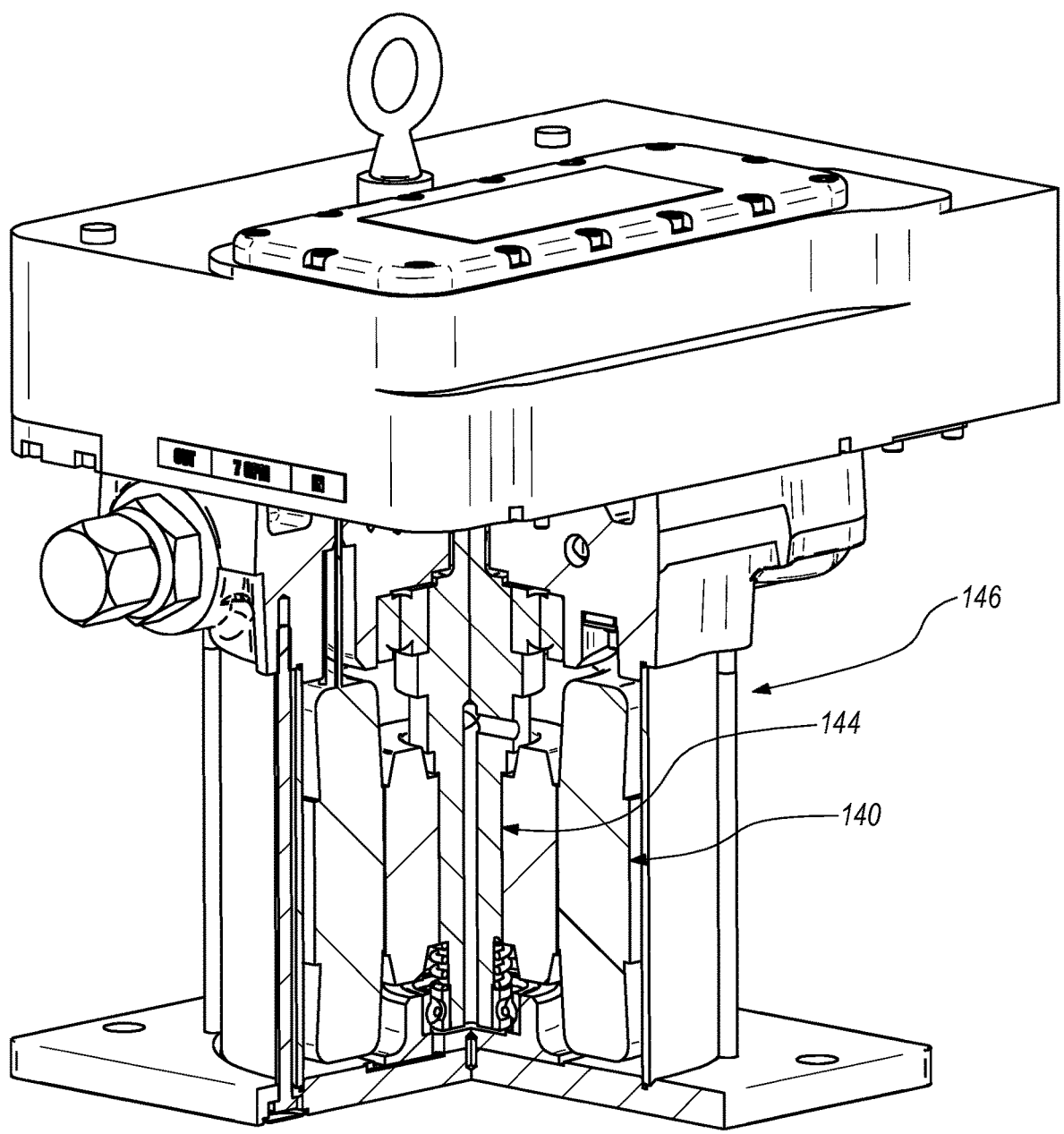
FIG. 3 illustrates an example rotor and stator configuration in an example embodiment of an inverter system.
Figure 4:
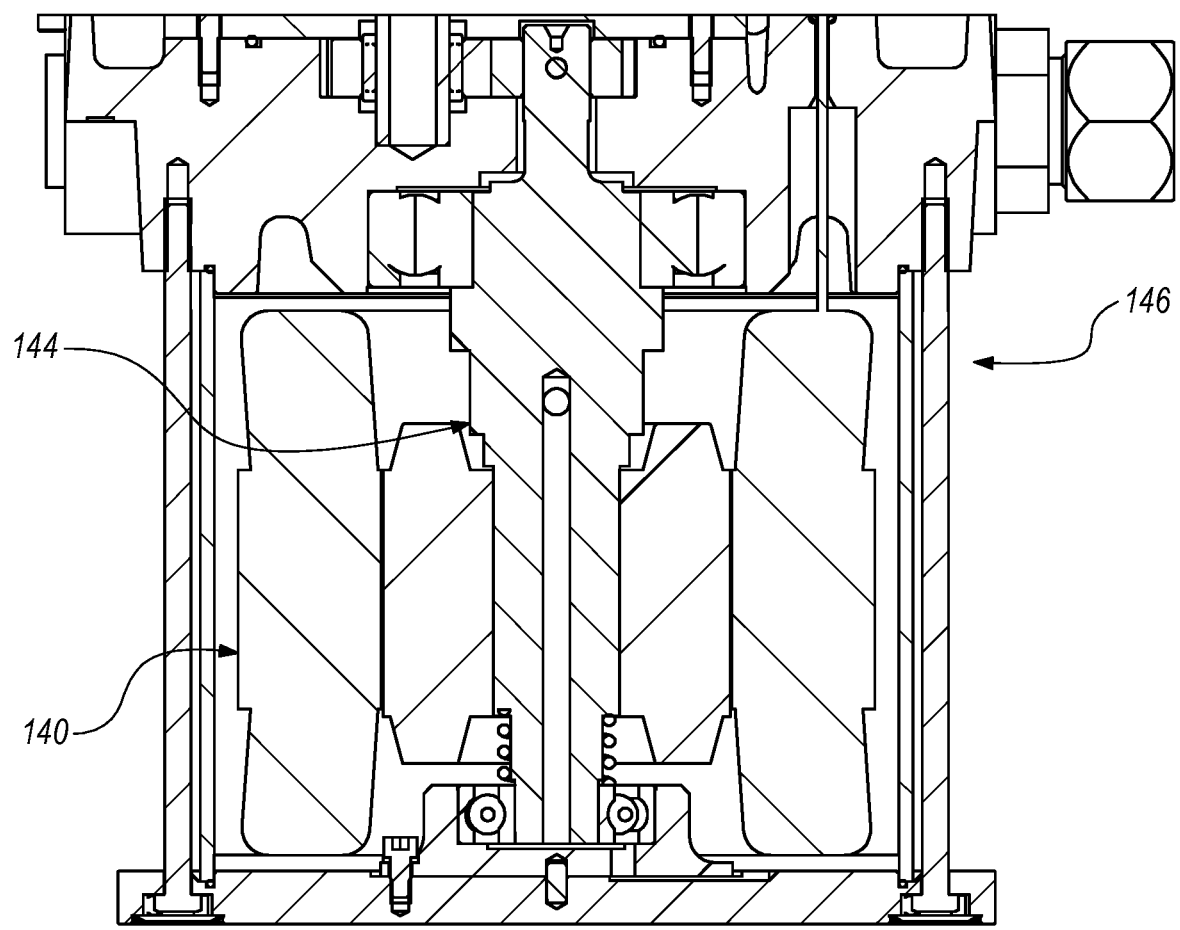
FIG. 4 illustrates a cross section of an example rotor and stator configuration in an example embodiment of an inverter system.

As shown in FIGS. 1 and 2, the inverter system is connected to an alternating current induction motor 146. As shown in FIGS. 3 and 4, the alternating current induction motor 146 further comprises a stator 140 and a rotor 144. As shown in FIG. 2, the stator 140 further comprises three coils 142.

FIG. 2 further shows the power switching circuit 126 connected to the motor stator 140. The three coils 142 of the motor stator are connected. In one embodiment, the three coils are delta connected as shown in FIG. 2. In other words, the three coils 142 are connected to form a closed structure, delta shape, or cycle. In alternate embodiments, the three coils 142 can be connected in other configurations, such as a star configuration. As shown in FIG. 2, point A of a power switching device pair is connected to a point between each pair of connected coils 142. Similarly, point B and point C are connected to points between other pairs of connected coils 142, as shown in FIG. 2.

The power switching devices 132 are turned on and off in a sequence that produces alternating current inputs to the three coils 142 of the motor stator 140. The phasing of the electrical inputs to the motor stator 140 induces a rotating magnetic field that produces torque on the rotor 144.

Control of the Induction Motor 146

As shown in FIG. 1, a motor controller 115 comprises a microcontroller 180, and one or more power switching device driver integrated circuits (IC) 128, the power switching circuit 126, the first current measurement circuit 170, current limiting circuit 172, temperature measurement circuit 176, and voltage measurement circuit 178. Each of these circuits may require different input voltages. For example, in one embodiment, the main power supply 160 requires an input voltage of 18-125 VDC, the microcontroller 180 requires an input voltage of 3.3 VDC, the power switching device driver ICs 128 require an input voltage of 13.5 VDC, and other circuits, such as the first current measurement circuit 170, current limiting circuit 172, temperature measurement circuit 176, and voltage measurement circuit 178, require an input voltage of 5 VDC.

Figure 5:
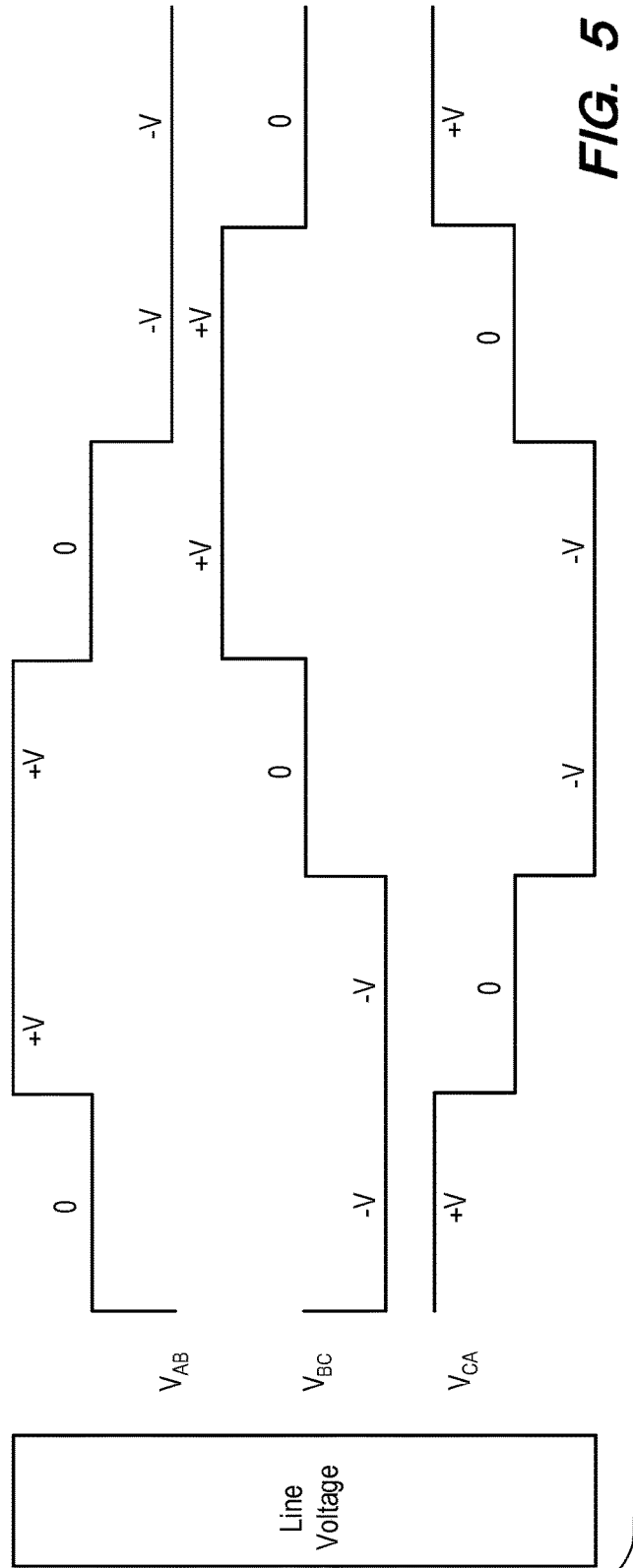
FIG. 5 illustrates an example six-step switching cycle.

The motor controller 115 controls the operation of the induction motor 146 by providing signals to turn the power switching devices 132 ON and OFF. The power switching devices 132 are operated in a six-step mode, meaning each full switching cycle comprises six switching steps. At the end of each six-step switching cycle another six step cycle is started. In an exemplary embodiment, the full six-step switching cycle is run at approximately 60 Hz, meaning approximately 360 switching steps occur each second. FIG. 5 shows an example of a six-step switching process. As shown in FIG. 5 in each step of the six-step switching process, one power switching device 132 in each power switching device pair 134 is ON and one power switching device 132 in each power switching device pair 134 is OFF. The combination of which of the power switching devices 132 are ON and which of the power switching devices 132 are OFF is different for each step in the six-step switching process. FIG. 5 also illustrates the corresponding line voltages with respect to points A, B, and C shown in FIG. 2 for each of the six steps in the exemplary switching process.

For systems with variable speed pumps, more advanced pulse-width-modulation (PWM) control of the six power switching devices 132 can be used. Several different methods can be used to generate a PWM wave form. For example, known methods, such as sinusoidal PWM, third harmonic injection PWM, saddle wave PWM, or space vector PWM, can be used.

Start/Stop Safety Logic Circuit 152

Figure 6:
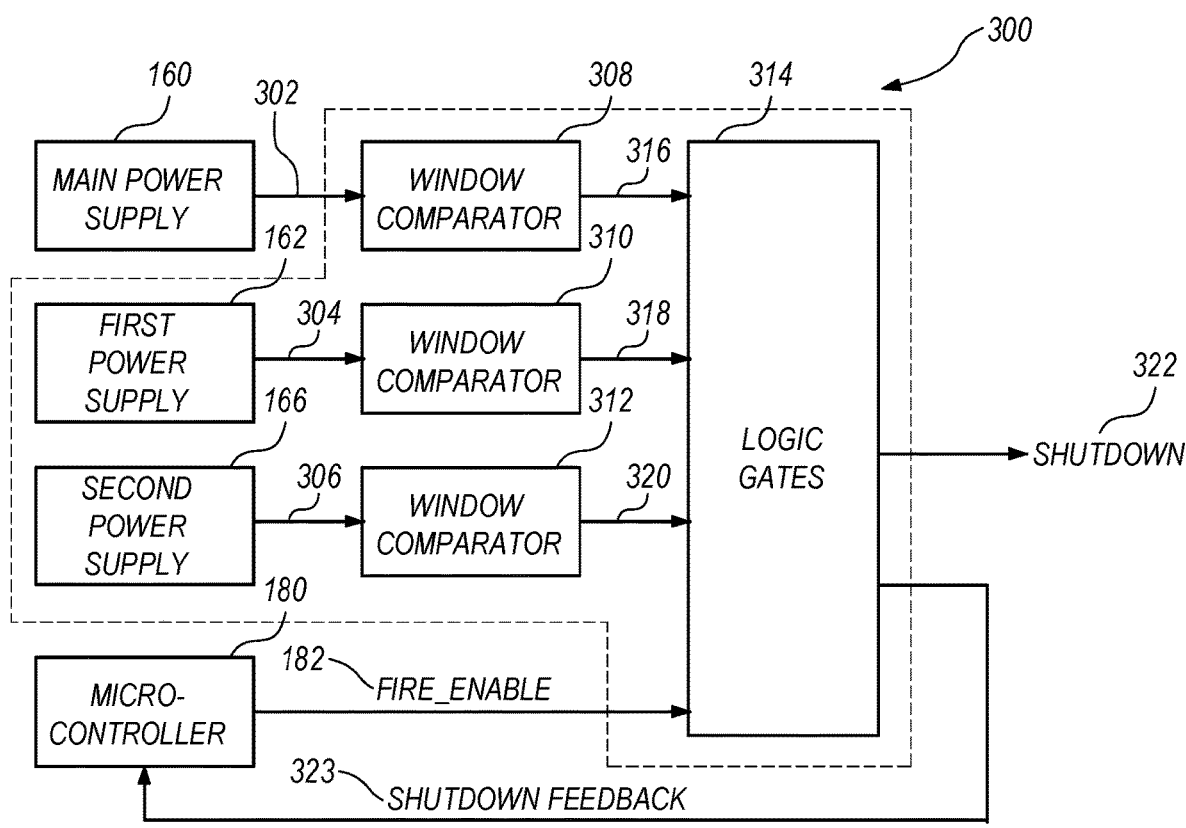
FIG. 6 illustrates a block diagram for an example power supply monitoring circuit.

The power supply monitoring circuit 300, as shown in FIG. 6, is part of the start/stop safety logic circuit 152 that monitor each power supply and produce digital outputs based on power supply voltages. The start/stop safety logic circuit 152 combines signals from the power supply monitoring circuit 300 and microcontroller 180 to start or stop the induction motor 146 when the inverter system 100 encounters unexpected loss of power or power excursions outside the safe operation range. The start/stop safety logic circuit 152 responds faster than a microcontroller and thus provides improved protection of the power switching devices 132 from unexpected loss of power and power excursions outside the safe operation range.

In alternate embodiments using additional power supplies, an additional window comparator is used for each additional power supply.

As shown in FIG. 6, in one embodiment the power supply monitoring circuit 300 of the start/stop safety logic circuit 152 comprises circuitry for monitoring the voltage from the main power supply 160 including a window comparator 308 that receives a DC input voltage 302 and outputs a first digital signal 316 to logic gates 314. The power supply monitoring circuit 300 of the start/stop safety logic circuit 152 further comprises circuitry for monitoring the voltage from the first power supply 162 including a window comparator 310 that receives a DC input voltage 304 and outputs a second digital signal 318 to the logic gates 314. The power supply monitoring circuit 300 of the start/stop safety logic circuit 152 also further comprises circuitry for monitoring the voltage from the second power supply 166 including a window comparator 312 that receives a DC input voltage 306 and outputs a third digital signal 320 to the logic gates 314.

There may be a minimum voltage that a power supply must output for proper operation of a particular circuit. For example, the main input power must output a minimum voltage to ensure the power switching devices 132 can be activated without compromising their reliability. The minimum voltage thresholds for each power supply are chosen to account for input signal hysteresis. This prevents oscillation of the digital output from the power supply monitor when the input voltage crosses back and forth across the threshold voltage. Further, the circuits must be protected from a power supply that outputs a voltage that is too high for proper operations. The window comparators 308, 310, and 312 determine whether the respective input voltages 302, 304, and 306 are within acceptable ranges for proper operation. For example, in one embodiment, the acceptable range for the voltage output by the main power supply 160 is 14V to 150V, the acceptable range for the voltage output by the first power supply 162 is 8.2V to 17V, and the acceptable range for the voltage output by the second power supply 166 is any voltage greater than or equal to 3.07V.

Window comparators are well-known in the art. For example, window comparators 308, 310, and 312 can each be an IC, such as a TPS3700. In an alternate embodiment, window comparators 308, 310, and 312 can be implemented using two comparators where one comparator detects an overvoltage and the other comparator detects an undervoltage. The outputs of the two comparators can be combined by logic gates, such as an AND gate. If the comparators determine that either the voltage is too high or the voltage is too low, the output of the window comparator will indicate the input voltage is outside the desired operating range.

The first digital output 316, the second digital output 318, and the third digital output 320 are used in conjunction with one another to sequence the activation and deactivation of the circuits in the motor controller 115 for the various startup and shutdown scenarios. These scenarios include normal startups and shutdowns upon application or removal of an input voltage and anomalous startups and shutdowns precipitated by the appearance or disappearance of an input voltage spike or sag.

The startup and shutdown processes provide glitch-free power up and power down driver operation.

Figure 7:
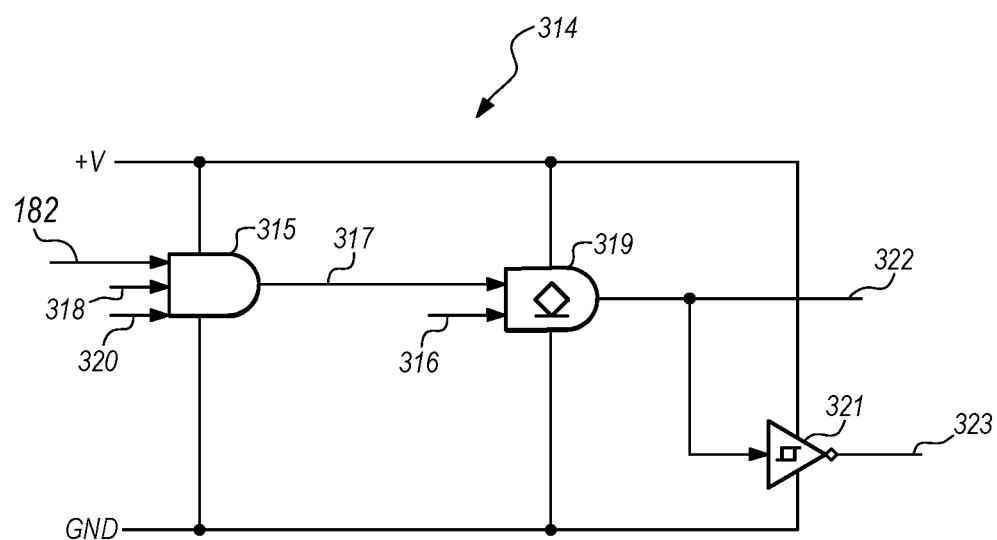
FIG. 7 illustrates an example start/stop safety logic circuit.

Logic gates 314 perform this high-speed processing of the monitor inputs. An example embodiment of logic gates 314 is shown in FIG. 7. Logic gates 314 receives as inputs the first digital output 316, the second digital output 318, and the third digital output 320 from the window comparators 308, 310, and 312 and a FIRE ENABLE signal 182 from the microcontroller 180. The logic gates perform the logic function on the inputs to produce a SHUTDOWN signal 322 that enables or disables the three power switching device drivers 128. Each of these drivers 128 controls a power switching device pair 134.

In one embodiment, if the FIRE ENABLE signal is low, such as 0 volts, it turns OFF the power switching devices immediately to ensure that they are not operating in unsafe conditions. For example, in one embodiment, the input to each of the three power switching device drivers 128 must be true (e.g., HIGH) or all three drivers will be turned OFF regardless of the value of the FIRE ENABLE signal 182 from the microcontroller 180. In other words, if any signal input to the logic gates 314 is LOW, then the power switching devices will be disabled using the SHUTDOWN signal 322. Another way of viewing this logic is that if any one of the inputs goes false (LOW or 0 V), inverter operation stops.

As shown in FIG. 7, a first AND gate 315 receives the FIRE ENABLE signal 182, the second digital signal 318, and the third digital signal 320 as inputs. The first AND gate output 317 serves as the FIRE-EN-OK signal and as an input to a second AND gate 319. The first digital signal 316 is a second input to the second AND gate 319. The output of second AND gate 319 is the SHUTDOWN signal 322. The output of second AND gate 319 is also input to an inverter gate 321. Inverter gate 321 has hysteresis to avoid oscillations. The output of inverter gate 321 is SHUTDOWN feedback signal 323, which is an input to the microcontroller 180 as shown in FIG. 6.

In one embodiment, the first AND gate 317 is an SN74LVC1G11, the second AND gate 319 is an SN74AHC1G09DBVR, and the inverter gate 321 is an SN74LVC1G14. However, it is well known that other gates or ICs could be used as logic gates 314 instead of these exemplary ICs.

Further, in an alternate embodiment, the logic gates 314 could be modified to use different types of logic gates, such as NAND, NOR, or OR gates, and different combinations of logic gates. Further, in an alternate embodiment, the logic could be modified such that a logic HIGH is used to turn OFF the three power switching device drivers 128.

The start/stop safety logic circuit 152 further comprises a digital feedback to the microcontroller 180 of all monitor measurements, start/stop safety logic status, and diagnostics. Outputs of start/stop safety logic circuit 152, including the first digital signal 316, the second digital signal 318, the third digital signal 320, and SHUTDOWN feedback signal 323 are provided to microcontroller 180 for processing.

Figure 8:
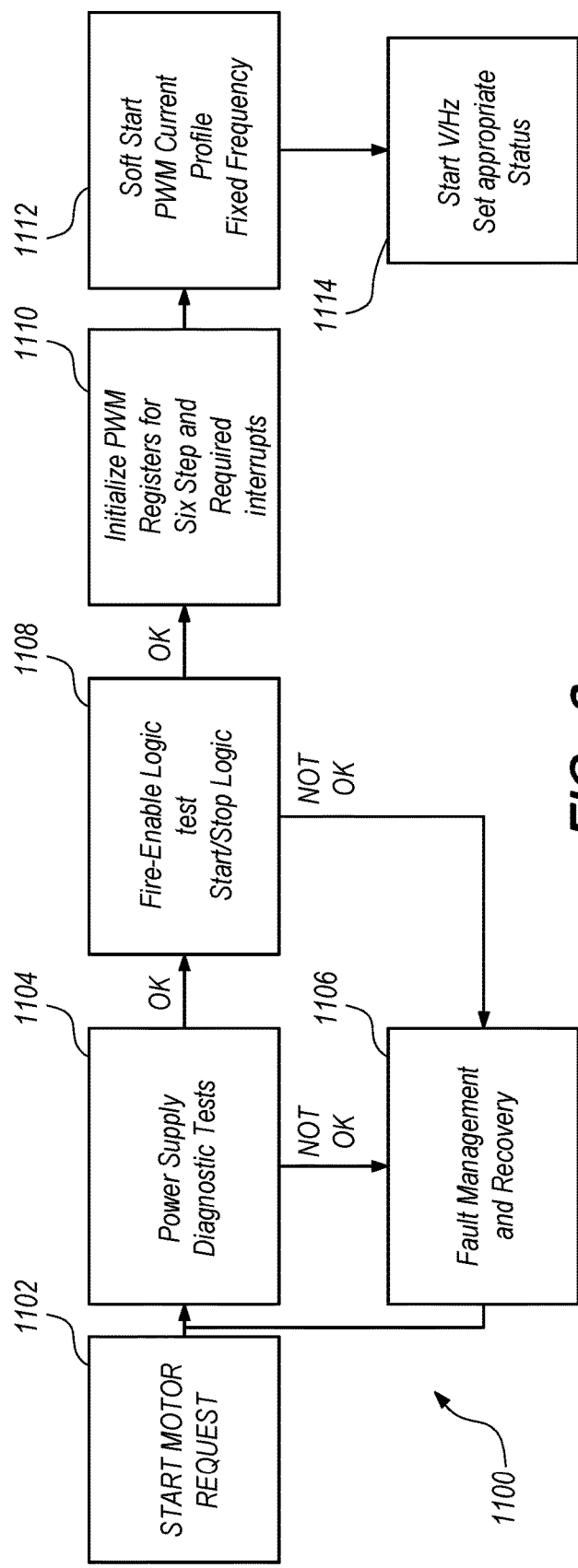
FIG. 8 is a flow diagram illustrating an example start motor sequence.

The Start/Stop safety logic circuit 152, along with the monitor information sent to the microcontroller 180, provides the necessary diagnostic inputs for proper microcontroller controlled start and stop programming processes. For example, every time a start motor firmware request is executed, such as in response to power up, a restart, or an external request, a firmware health diagnostic is performed using the monitor information 1104 along with a FIRE ENABLE logic test 1108 as shown in FIG. 8. As shown in FIG. 6, SHUTDOWN feedback signal 323 confirms a microcontroller 180 controlled shutdown or alerts the microcontroller 180 of an immediate hardware shutdown.

The start motor sequence 1100 is shown in FIG. 8. At step 1102, start motor request is received. At this point, the motor is not running, the FIRE ENABLE signal 182 from the microcontroller 180 is not active, and the signal to the power switching device drivers 128 is not active. Upon detection of a start motor request, the system proceeds to step 1104. At step 1104, it determines whether the first power supply 162 and second power supply 166, such as 13.5 V and 3.3 V power supplies, are within their proper operational ranges. If the power supplies are within their proper operational ranges, it proceeds to step 1108. If not, it proceeds to step 1106.

At step 1106, fault management and recovery operations are performed. After the fault management and recovery operations are complete, it proceeds back to step 1104.

At step 1108, it determines whether the main power supply is within operational range and whether the microcontroller 180 has proper control over the power switching device drivers 128. If yes, then it goes to step 1110. If no, then it goes to step 1106. At step 1110, initialization of registers in the microcontroller 180 for the six step process takes place for starting the six step switching process. After initialization is complete, it proceeds to step 1112. At step 1112, the FIRE ENABLE signal 182 is turned on, or activated, to turn on the power switching device drivers 128 and the six step operation begins. After the power switching device drivers 128 are turned on, it proceeds to step 1114. At step 1114, the transistor operational frequency is adjusted according to the input voltage (i.e., V/Hz operation). At this point, the motor 146 is operational in V/Hz mode.

Figure 9:
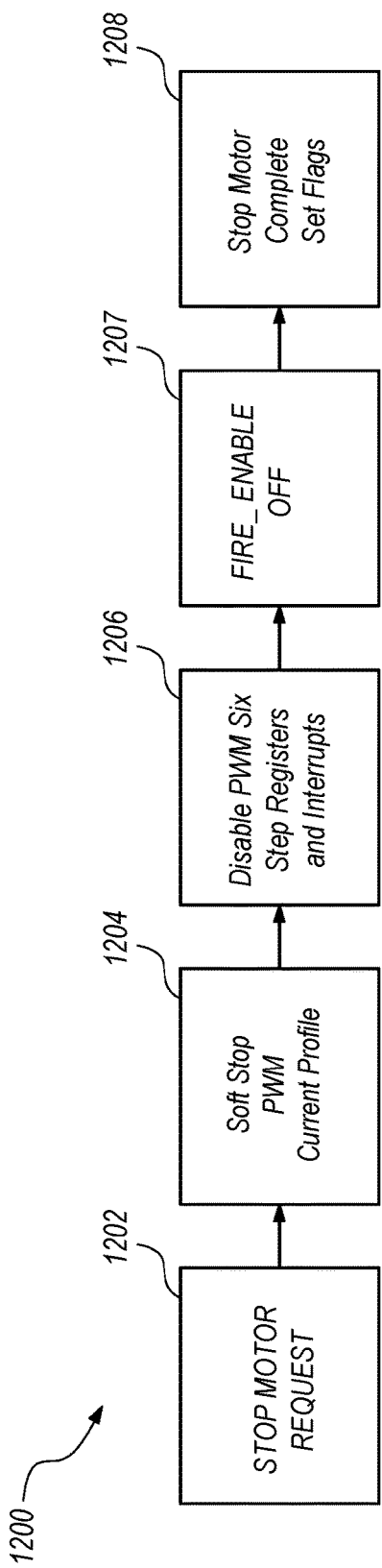
FIG. 9 is a flow diagram illustrating an example stop motor sequence.

The stop motor sequence 1200 is shown in FIG. 9. At step 1202, when a stop motor request is received, the motor is running, the FIRE ENABLE signal 182 from the microcontroller 180 is active, and the signal to the power switching device drivers 128 is active. Upon detection of a stop motor request, the microcontroller 180 acknowledges the stop motor request, and the system proceeds to step 1202. At step 1204, the microcontroller 180 ramps the current down to zero, followed by a stop of the V/Hz operation. Then the six step switching operation is stopped. After the six step switching operation is stopped, it proceeds to step 1206. At step 1206, the registers in microcontroller 180 for the six step process are set for a no operation state. Then it proceeds to step 1207. At step 1207, the FIRE ENABLE signal 182 is turned off. Then it proceeds to step 1208. At step 1208, the microcontroller 180 updates the system status to indicate the motor 146 has stopped.

Current Limit Circuit 172

Figure 10:
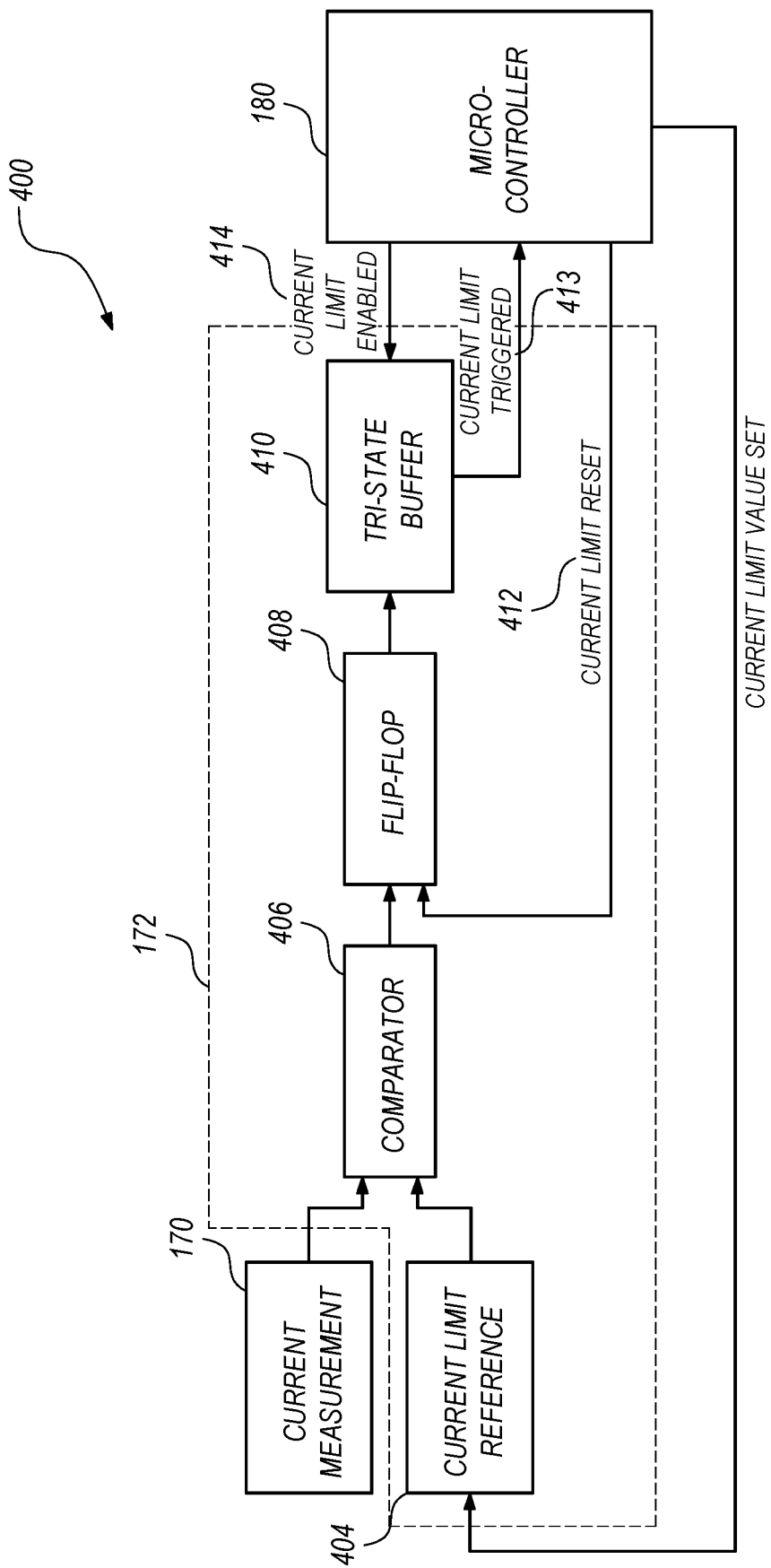
FIG. 10 illustrates a block diagram for an example current limiting circuit.

The inverter system 100 further comprises a current limit circuit 172 to limit current. The current limit circuit 172 responds faster than implementations and methods that rely on a microcontroller to limit current. As shown in FIG. 10, the current limit circuit 172 receives the output of the first current measurement circuit 170. The current limit circuit 172 comprises comparator 406, a programmable current limit reference 404 to optimize the performance of the current limiting circuit 172, a flip-flop 408, and a tri-state buffer 410.

In one embodiment, the first current measurement circuit 170 is connected to the switching device return line 175 in the power switching circuit 126, as shown in FIG. 1, outputs a 0 to 3.3 VDC analog signal for a 0 to 150 amp input. The switching device return line 175 is the point where all the power switching device pairs 134 are connected together on the low side as shown in FIG. 2.

The comparator 406 compares the instantaneous output from the first current measurement circuit 170 to the current limit reference 404 from the microcontroller 180. In one embodiment, if the output of the first current measurement circuit 170 is less than the current limit reference 404, then comparator 406 outputs a LOW signal. If the output of the first current measurement circuit 170 is greater than the current limit reference 404, then comparator 406 outputs a HIGH signal.

In one embodiment, two or more current limit references can be stored for use in different operational conditions. The current limit reference 404 can be changed while the system is running based on predetermined startup and shutdown profiles or based on other inputs to the microcontroller 180. For example, the temperature measurement 176 can be used to change the current limit reference 404 to a new discrete value to account for elevated power switching circuit temperatures. In another embodiment, the current limit reference 404 can be continuously varied based on one or more inputs to the microcontroller 180. The current limit references can be changed with a firmware update.

The output of comparator 406 is input to a flip-flop 408. The flip-flop 408 may be a D type flip-flop, and in one embodiment it may be an IC. The output of the flip-flop 408 latches to HIGH if the output of the comparator 406 is HIGH. A reset signal 412 from the microcontroller 180 is also input to the flip-flop 408. This reset signal 412 resets the output of flip-flop 408 to LOW at every power switching step and immediately after a change to HIGH. This reset capability allows for fast and precise current limit control.

The output of flip-flop 408 is input to a tri-state buffer 410 to minimize the noise effects between the analog and digital returns. A current limit enable signal 414 from the microcontroller 180 is also input to the tri-state buffer 410. The tri-state buffer 410 outputs a digital current limit trigger signal.

In one embodiment, when the current limit enable signal 414 is LOW, current limiting is enabled. If the current is below the current limit, then the output 413 of the tri-state buffer 410 will be HIGH to signal normal operation. If the current is above the current limit, then the output 413 of the tri-state buffer 410 will be LOW to signal a fault interrupt at the tri-state buffer output 413. When the current limit enable signal 414 is HIGH, current limiting is disabled. In this scenario, the output 413 of the tri-state buffer 410 will be high impedance creating an open circuit irrespective of whether the current is above or below the current limit.

The digital current limit trigger signal is input to a pin on the microcontroller 180 that is configured as a fault interrupt pin. In one embodiment, this pin is connected to a hardware-based, fast-acting circuit within the microcontroller 180 which places all six power switching devices 132 in a predetermined fault state immediately upon receipt of a LOW signal from the tri-state buffer 410. The current limit fault state is configurable but in one embodiment is an open circuit on all six power switching devices. In an alternate embodiment, as one of skill in the art would understand, circuitry external to the microcontroller 180 can also be used to immediately place all six power switching devices 132 in a predetermined fault state upon receipt of a signal from the tri-state buffer 410.

The advantage of this current limiting scheme is that it is nearly instantaneous and extremely precise such that power to the pump 150 will be interrupted only for the number of switching steps where the current is above the current limit reference 404. The basic operation of the microcontroller 180 is not altered when the current limit is exceeded. Instead, the microcontroller 180 continues to cycle through the six-step switching process. Accordingly, when the current drops back below the current limit reference 404, the inverter system 100 resumes normal operation. If the interruption is brief enough that the rotor 144 has not slowed significantly, the resumption of operation will be in synchronization with the rotor position, minimizing the current spike associated with out-of-sync switching.

The instantaneous output from the first current measurement circuit 170 and the state of the current limiting logic indicated by tri-state buffer output 413 are also input to the microcontroller 180. In one embodiment, the microcontroller 180 regularly records the value of these parameters, along with various other parameters, to provide information on current and past operational status.

Figure 11:
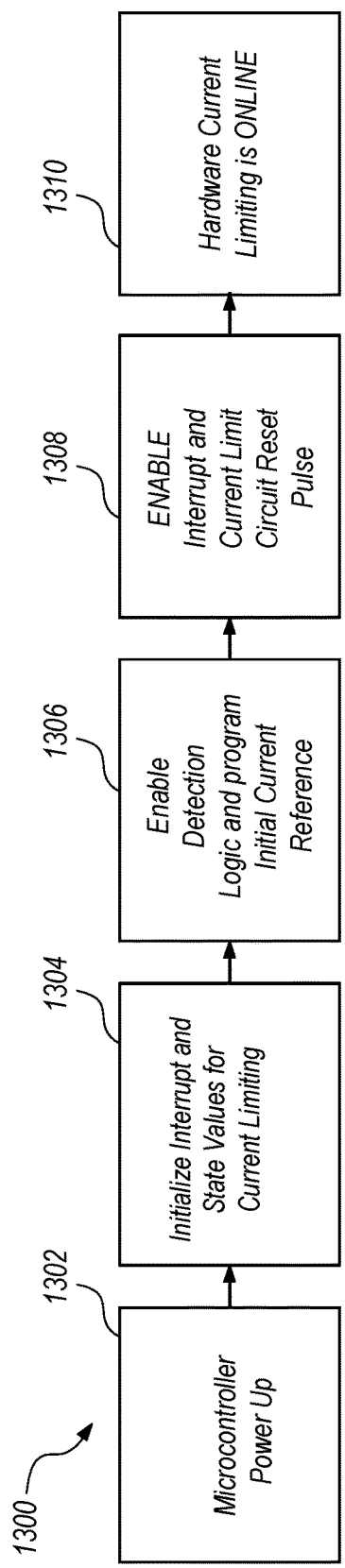
FIG. 11 is a flow diagram illustrating an example power up current limiting initialization sequence.

The hardware current limiting initialization sequence 1300 is shown in FIG. 11. Once the main power supply is turned on, at step 1302, the microcontroller 180 powers up. Then it proceeds to step 1304. At step 1304, the microcontroller 180 performs initialization for the hardware current limiting operation. For example, in one embodiment it initializes interrupts and transistor state values for use in current limiting. Then it proceeds to step 1306. At step 1306, the microcontroller 180 enables internal detection logic, which is used for fast turnoff of the power switching devices. In one embodiment using the dsPIC33, this is accomplished by enabling internal CL1_# detection logic. Then the microcontroller 180 sends current limit programming bits to the current limit reference hardware. The output of the reference hardware is used to compare against actual motor current determined by the current measurement circuit 170. Next it proceeds to step 1308. At step 1308, the microcontroller 180 enables a hardware current limiting interrupt and a current limit circuit reset pulse. Then it proceeds to step 1310. At step 1310, the current limiting capability is active. At this point, the current limiting operation will be enabled by current above the programmed threshold.

Figure 12:
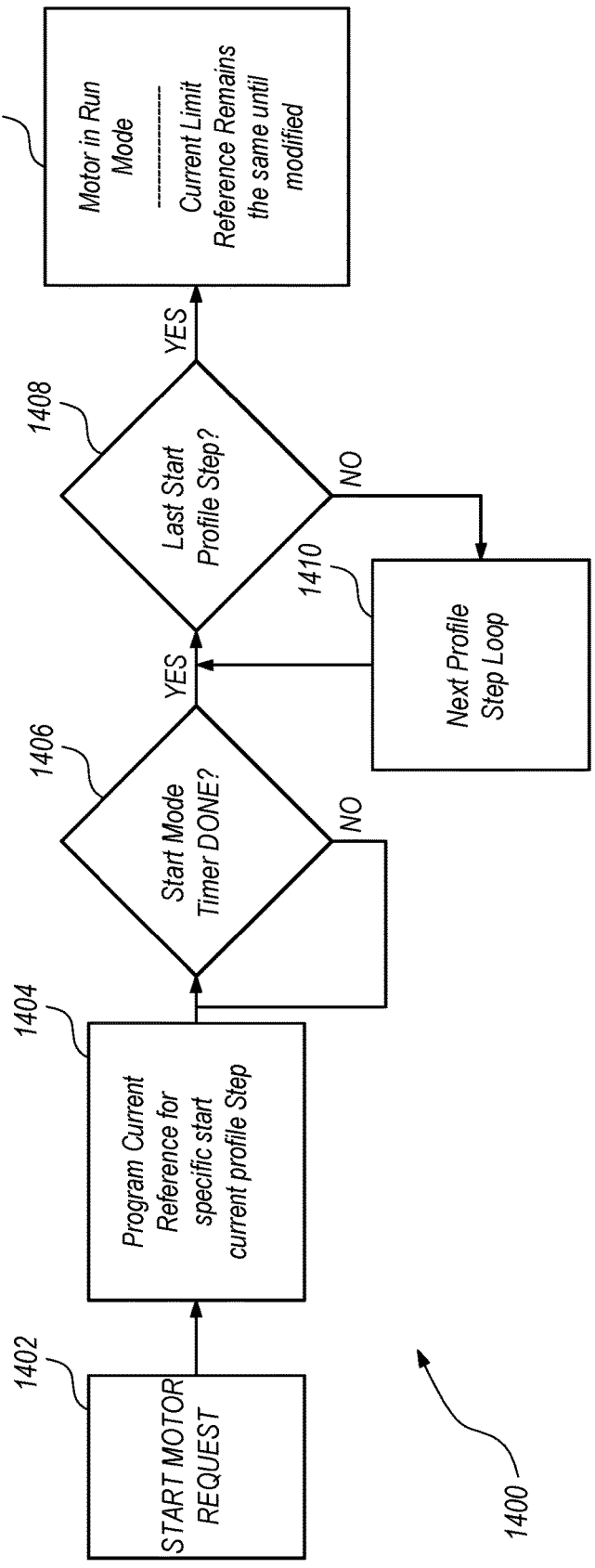
FIG. 12 is a flow diagram illustrating an example current liming initialization and arming sequence in response to a start motor request.

The hardware current limiting operation sequence 1400 is shown in FIG. 12. At the beginning of step 1402, the motor is not running, the FIRE ENABLE signal 182 from the microcontroller 180 is not active, and the signal to the power switching device drivers 128 is not active. When a start motor request is detected, it proceeds to step 1404. In step 1404, the microcontroller 180 sets the hardware current references for each start current profile step with the threshold value for comparison to the actual operational current. Then it proceeds to step 1406. In step 1406, a start mode timer is used to delay activation of the current limiting capability. At the completion of this step, current limiting is active and the system proceeds to step 1408. In one embodiment, additional unique profile steps are run, each with their unique current limit references that were set in step 1404. The microcontroller 180 detects whether the last step of the start profile has been completed. If yes, then it proceeds to step 1412. If no, then it proceeds to step 1410, which initiates the next profile step.

In step 1410, the next profile step is set. Then it proceeds to step 1408.

In step 1412, the normal operation current limiting capability is active.

Operational Status and Parameter Monitoring and Communication

Figure 13:
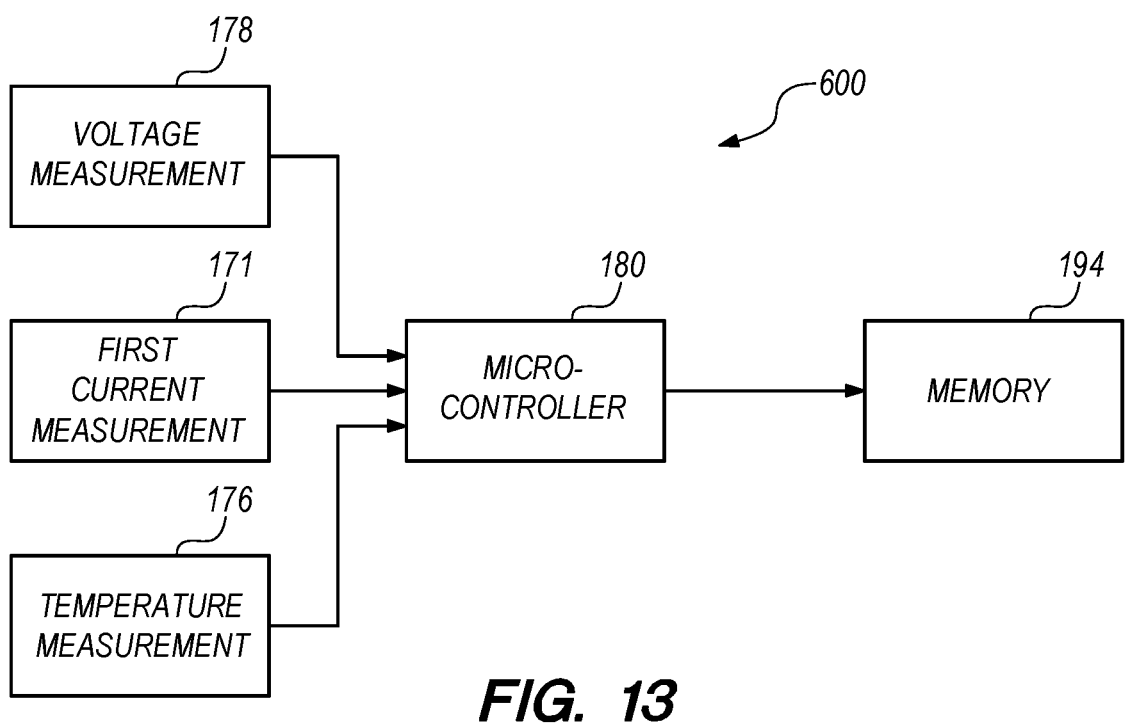
FIG. 13 illustrates a block diagram for an example parameter monitoring and recording circuit.

As shown in FIG. 13, the inverter system 100 further comprises circuitry to monitor the values of multiple operational parameters and record them in internal memory in the microcontroller 180 or memory 194. The parameter monitoring circuitry 600 includes the voltage measurement circuit 178, the second current measurement circuit 171, and the temperature measurement circuit 176. The microcontroller 180 controls the monitoring and recording of the operational parameters. The outputs from the voltage measurement circuit 178, the second current measurement circuit 171, and the temperature measurement circuit 176 are inputs to the microcontroller 180. Based on these inputs, the microcontroller 180 records in memory 194 one or more counts such as total life count, firmware life count, successful start count, unsuccessful start count, low voltage event count, locked rotor count, external clock fail count, PWM mis-timed count, software reset count, brown-out reset count, and shutdown count.

This operational status, parameter monitoring, and communication feature facilitates in-situ or post-operational analysis of pump conditions for troubleshooting based on actual conditions. Communication with memory 194 is accomplished via a serial interface such as an SPI interface or another serial communication interface or protocol. The stored data is accessible via a bus such as CANbus or another communication protocol.

Figure 14:
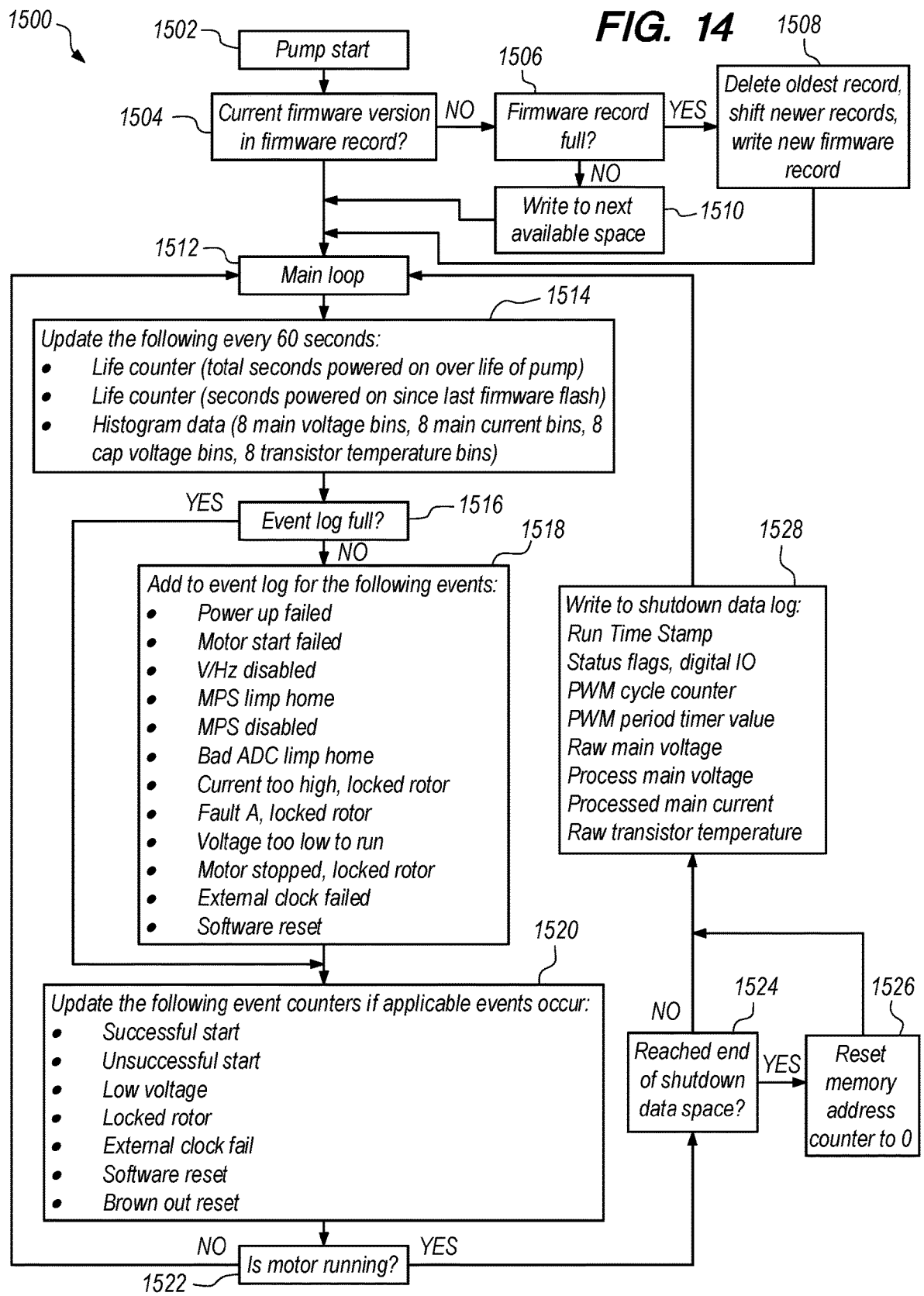
FIG. 14 is a flow diagram illustrating an example embodiment of certain operational monitoring steps of an example embodiment of the inverter system.

FIG. 14 illustrates an example embodiment of certain operational monitoring steps 1500 of an example embodiment of inverter system 100.

After the pump starts 1502, the microcontroller 180 checks whether the current firmware version is in the firmware record 1504. If not, then it goes to step 1506 where it checks whether the firmware record is full. If the firmware record is full, then it goes to step 1508 and deletes the oldest record, shifts the newer records, writes the new firmware record, and proceeds to step 1512. If in step 1506 the firmware record is not full, then it proceeds to step 1510, writes to the new firmware record to the next available space, and then proceeds to step 1512.

Step 1512 is the start of the main loop of the firmware or software for operational monitoring. When step 1512 is reached, it proceeds to step 1514 where data is updated. In one embodiment, data is updated every 60 seconds. The updates include updating a first life counter for total seconds powered on over the life of the pump, updating a second life counter for the seconds powered on since the last firmware flash, updating histogram data, including in one embodiment 8 main voltage bins, 8 main current bins, 8 cap voltage bins, and 8 transistor temperature bins. When the updates are completed in step 1514, it proceeds to step 1516 where it is determined if the event log is full. If the event log is not full, then it proceeds to step 1518 where data is added to the event log for events including, in one embodiment, power up failed, motor start failed, V/Hz disabled, Main Power Status (MPS) limp home, MPS disabled, bad ADC limp home, current too high/locked rotor, fault A/locked rotor, voltage too low to run, motor stopped/locked rotor, external clock failed, and software reset.

Following completion of step 1518, it proceeds to step 1520. If the event log is found to be full in step 1516, then it proceeds to step 1520.

In step 1520, counters are updated if applicable events occur including, in one embodiment, successful start, unsuccessful start, low voltage, locked rotor, external clock fail, software reset, and/or brown out reset. At the completion of step 1520, it proceeds to step 1522 where it is determined if the induction motor 146 is running. If the induction motor 146 is not running, then it proceeds to step 1512. If the induction motor 146 is running, it proceeds to step 1524 where it is determined if it has reached the end of shutdown data space. If yes, then it proceeds to step 1526 where it resets the memory address counter to 0 and then goes to step 1528, over-writing the oldest shutdown data. If it has not reached the end of shutdown data space, it proceeds to step 1528, writing to next available memory location. After writing shutdown data, the program returns to step 1512.

In one example embodiment, shutdown data contains the pump's latest 2.5 minutes of run data at a sample rate of approximately 6 samples/second. The shutdown data includes data such as a 32-bit timestamp, program state variables, system diagnostic flags, the PWM cycle count, PWM period value, raw main bus voltage, processed bus current, and transistor temperature.

Visual Signalization

Figure 15:
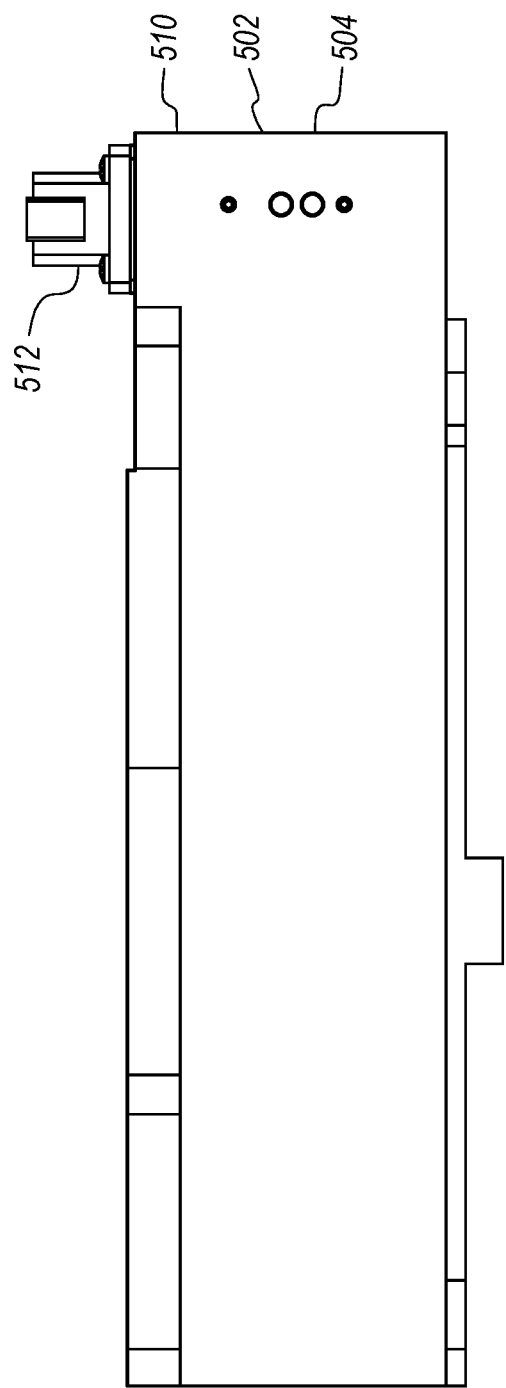
FIG. 15 illustrates an example of an inverter system housing, data connector, and indicators for visual signalization.
Figure 16:
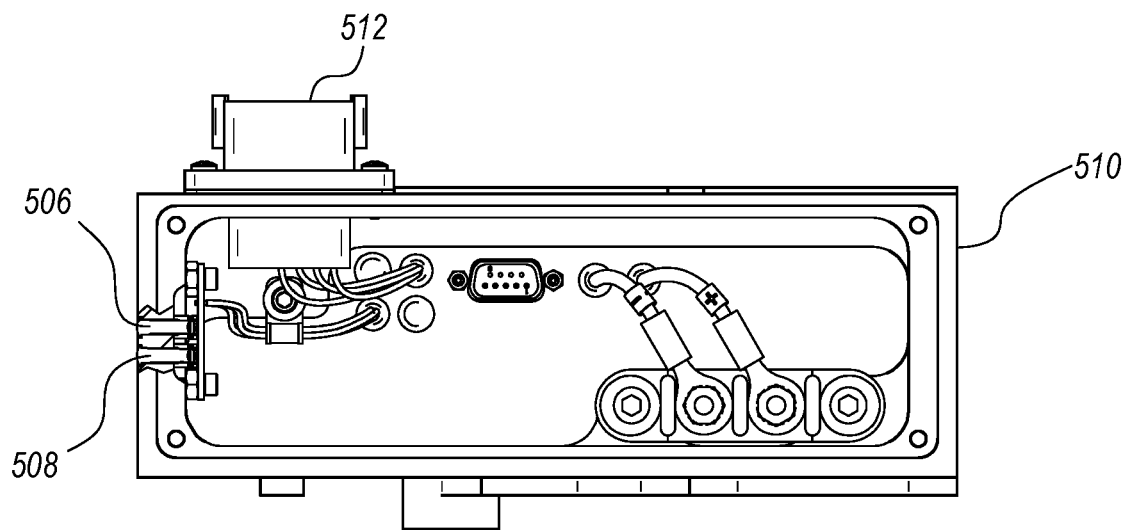
FIG. 16 illustrates an example of an inverter system housing, data connector, and light pipes for visual signalization.
Figure 17:
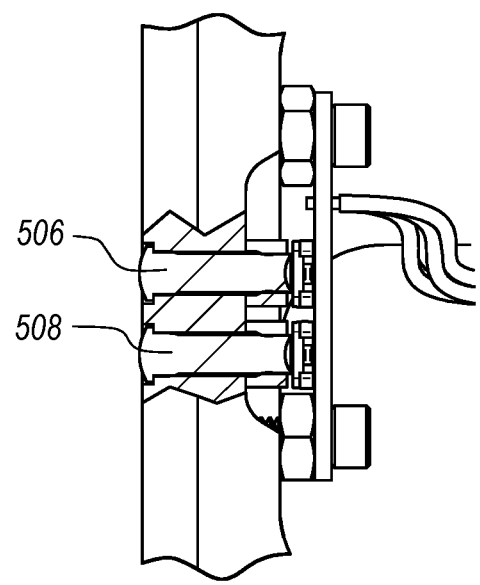
FIG. 17 illustrates an example of an expanded view of light pipes for visual signalization.

As shown in FIGS. 15, 16, and 17, the inverter system 100 incorporates visual signalization to visually convey information about the fuel pump's operational status, which in one embodiment comprises at least two light-emitting diodes (LEDs). In one embodiment, the LEDs include a green LED 502 and a yellow LED 504. However, any two different colors of LEDs can be used. The green LED 502 and the yellow LED 504 are positioned such that they are visible in the majority of inverter system and pump installation orientations. In one embodiment, a steady green light emitted by green LED 502 indicates the pump is operating normally. In one embodiment, a signal that incorporates a steady or flashing light emitted by yellow LED 504 or alternating green light emitted by the green LED 502 and yellow light emitted by the yellow LED indicates an anomalous condition has been encountered.

In one embodiment, the inverter system 100 has the ability to produce a variety of signals that can convey the specific anomaly or type of anomaly being reported. Examples of anomalous conditions that can be signaled via the LEDs 502 and 504 include a locked or stalled rotor, a dry run condition, a clogged filter condition, a high or low temperature condition, internal measurement malfunction, or reduced functionality operation such as limp home mode.

As shown in FIGS. 15 and 16, the green LED 502 and the yellow LED 504 are located within the inverter housing 510 to protect the LEDs 502 and 504 from the engine environment. As shown in FIGS. 16 and 17, light pipes 506 and 508 are used to transmit the light from green LED 502 and yellow LED 504 to the exterior of the inverter system 100.

Closed Loop Control and Remote Operation of Units while in Service

The inverter system 100 is designed to operate in open-loop, constant-speed mode or with external inputs. Examples of external inputs include External Start/Stop Command, Pressure, Temperature, Flow Rate, and RPM.

Figure 18:
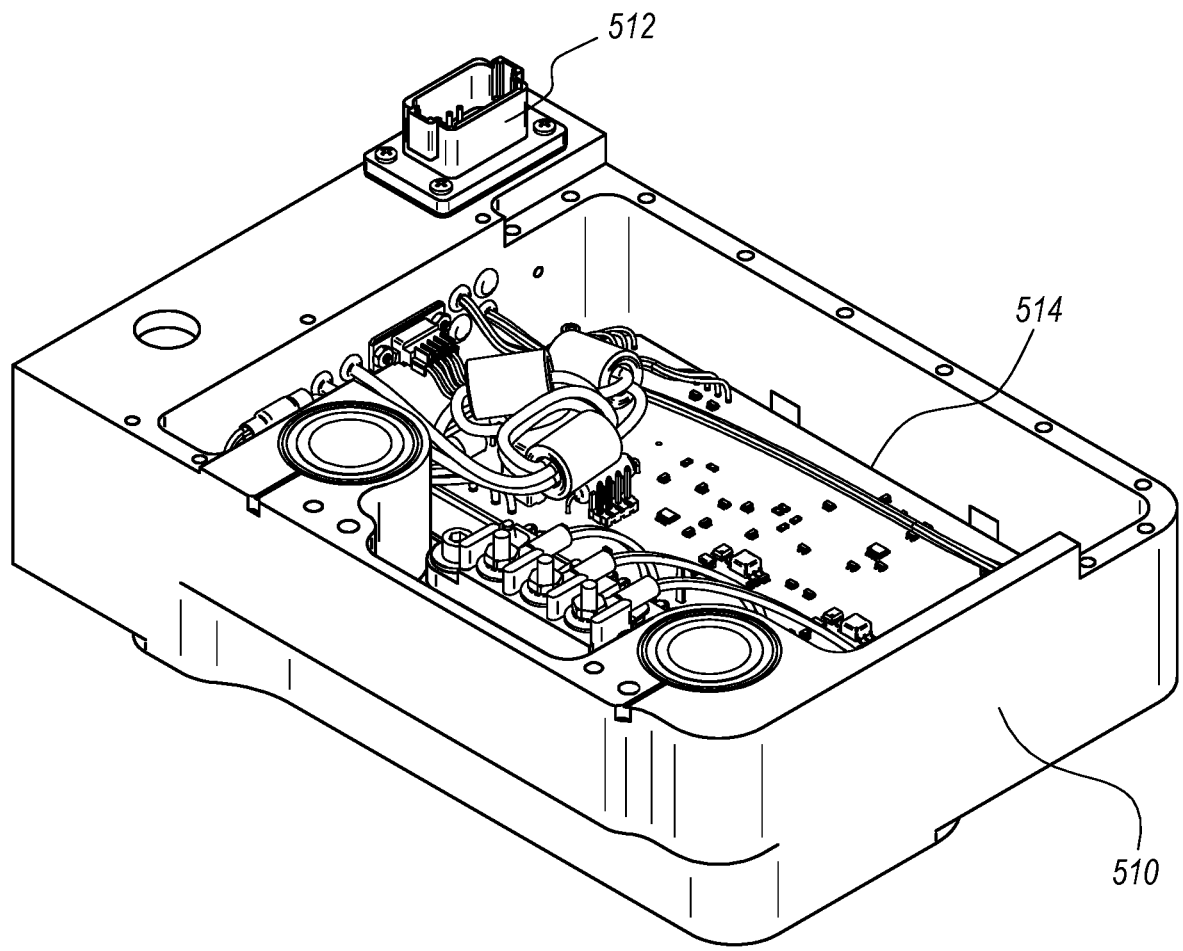
FIG. 18 illustrates an example data connector and controller board.

As shown in FIGS. 16 and 18, in one embodiment, the inverter system 100 includes a data connector 512, such as a rugged, 12-pin data connector, and controller board 514 that facilitates multiple modes of operation in addition to the standard open-loop, constant-speed mode. These additional run modes may include one or more modes such as remote start/stop, remote pump direction control (forward or reverse), closed-loop operation in pressure control mode, or closed loop operation in flow rate control mode.

The operational mode can be changed via firmware update. If a closed-loop input signal is lost, the inverter system 100 can be configured to revert back to a standard open-loop run mode or a fault mode with reduced output. This feature allows for maximum operational flexibility for units in service.

Locked Rotor Detection

A locked rotor condition can be detected during modes where the motor 146 is running and the hardware current limiting capability is active and operational. If the rotor 144 stops turning completely or is significantly slowed down, such as by an obstruction within the pump 150, the motor current will rise significantly and trigger the current limiting operation. The inverter system 100 counts the number of steps during which the current is limited. If the number of steps where the current is limited exceeds a continuous count threshold or a profile count threshold, then the rotor 144 is considered locked, and the microcontroller 180 will indicate a locked rotor condition.

In one example embodiment, when the current limit is exceeds for 240 consecutive steps, then the rotor 144 is considered locked. In another embodiment, the repetition of a pattern of steps with the current limit exceeded over a longer period of time will indicate a locked rotor.

In one embodiment, the locked rotor condition will be indicated using LEDs, such as the green LED 502 and/or the yellow LED 504. For example, in one embodiment, the yellow LED 504 can be repeatedly blinked, or in an alternate embodiment, a light sequence pattern may alternate between illuminating the green LED 502 and the yellow LED 504 to indicate the locked rotor condition.

The disclosed embodiments are illustrative, not restrictive. While specific configurations have been described, it is understood that the present invention can be applied to a wide variety of applications. There are many alternative ways to implement the invention.

We claim:

1. An inverter and motor system for driving a fluid transfer pump comprising:
   a main power supply for providing a main voltage level;
   an alternating current induction motor comprising:
      a rotor; and
      a stator comprising three coils;
   an inverter system comprising:
      a microcontroller connected to a memory;
      a first current measurement circuit comprising a current transducer;
      a power switching circuit comprising:
         a plurality of power switching devices arranged as a plurality of power switching device pairs, each of the plurality of power switching device pairs comprising:
            a high-side power switching device;
            a low-side power switching device; and
            wherein the high-side power switching device is connected to the low-side power switching device;
         wherein the power switching circuit is connected to the stator;
      a current limit circuit comprising:
         a comparator connected to the first current measurement circuit and to a current limit reference;
         a flip-flop connected to the comparator and to a reset signal from the microcontroller; and
         a tri-state buffer connected to a current limit enable signal from the microcontroller and to the flip-flop, wherein the tri-state buffer disables the power switching circuit while the current limit reference is exceeded;
      a first power supply for providing a first voltage level to the power switching circuit;
      a second power supply for providing a second voltage level to the microcontroller; and a power supply monitoring circuit wherein the power supply monitoring circuit determines whether the first voltage level is within a first range, the second voltage level is within a second range, and the main voltage level is within a third range.

2. The inverter and motor system of claim 1 wherein each of the plurality of power switching devices comprises a transistor.

3. The inverter and motor system of claim 2 wherein exactly one of the power switching devices in each of the plurality of power switching device pairs is on in each step of a six step switching cycle.

4. The inverter and motor system of claim 1 further comprising a parameter monitoring circuit, the parameter monitoring circuit comprising:
   a voltage measurement circuit having a voltage measurement circuit output connected to the microcontroller, wherein the microcontroller stores information in the memory related to the voltage measurement circuit output;
   a second current measurement circuit having a second current measurement circuit output connected to the microcontroller, wherein the microcontroller stores information in the memory related to the second current measurement circuit output; and
   a temperature measurement circuit having a temperature measurement output connected to the microcontroller, wherein the microcontroller stores information in the memory related to the temperature measurement circuit output.

5. The inverter and motor system of claim 1 wherein the three coils of the stator are delta connected.

6. The inverter and motor system of claim 1 wherein the first power supply comprises a 13.5 volt power supply.

7. The inverter and motor system of claim 1 wherein the second power supply comprises a 3.3 volt power supply.

8. The inverter and motor system of claim 1 wherein the power supply monitoring circuit comprises:
   a first window comparator connected to the main power supply and having a first digital output;
   a second window comparator connected to the first power supply and having a second digital output;
   a third window comparator connected to the second power supply and having a third digital output; and
   at least one logic gate connected to the first digital output, the second digital output, and the third digital output.

9. The inverter and motor system of claim 1 wherein the temperature measurement circuit comprises a thermistor.

10. The inverter and motor system of claim 1 wherein the voltage measurement circuit comprises a low pass filter and buffer.

11. The inverter and motor system of claim 1 wherein the second current measurement circuit comprises a second current transducer.

12. The inverter and motor system of claim 1 wherein:
   the temperature measurement circuit comprises a thermistor;
   the voltage measurement circuit comprises a low pass filter and buffer; and
   the second current measurement circuit comprises a second current transducer.

13. The inverter and motor system of claim 1 further comprising a first light emitting diode and a second light emitting diode.

14. The inverter and motor system of claim 13 wherein the first light emitting diode comprises a green light emitting diode and the second light emitting diode comprises a yellow light emitting diode.

15. The inverter and motor system of claim 14 wherein the microcontroller is configured to cause the yellow light emitting diode to blink to indicate a locked rotor condition when the current limit reference is exceeded for a plurality of six step switching cycles.

16. An inverter system for driving an alternating current induction motor comprising:
   a microcontroller connected to a memory;
   a first current measurement circuit comprising a current transducer;
   a power switching circuit comprising:
      a plurality of power switching devices arranged as a plurality of power switching device pairs, each of the plurality of power switching device pairs comprising:
         a high-side power switching device;
         a low-side power switching device; and
         wherein the high-side power switching device is connected to the low-side power switching device;
      wherein the power switching circuit outputs a three-phase switching pattern for driving an alternating current induction motor;
   a current limit circuit comprising:
      a comparator connected to the first current measurement circuit and to a current limit reference;
      a flip-flop connected to the comparator and to a reset signal from the microcontroller; and
      a tri-state buffer connected to a current limit enable signal from the microcontroller and to the flip-flop, wherein the tri-state buffer disables the power switching circuit while the current limit reference is exceeded;
   a first power supply for providing a first voltage level to the power switching circuit;
   a second power supply for providing a second voltage level to the microcontroller;
   a power supply monitoring circuit wherein the power supply monitoring circuit determines whether the first voltage level is within a first range and the second voltage level is within a second range;
   a parameter monitoring circuit comprising:
      a voltage measurement circuit having a voltage measurement circuit output connected to the microcontroller, wherein the microcontroller stores information in the memory related to the voltage measurement circuit output;
      a second current measurement circuit having a second current measurement circuit output connected to the microcontroller, wherein the microcontroller stores information in the memory related to the second current measurement circuit output; and
      a temperature measurement circuit having a temperature measurement output connected to the microcontroller, wherein the microcontroller stores information in the memory related to the temperature measurement circuit output.

17. The inverter system of claim 16 wherein each of the plurality of power switching devices comprises a transistor.

18. The inverter system of claim 17 wherein exactly one of the power switching devices in each of the plurality of power switching device pairs is on at each step in a six step switching cycle.

19. The inverter system of claim 16 wherein the power supply monitoring circuit comprises:
- a first window comparator connected to the first power supply and having a first digital output;
- a second window comparator connected to the second power supply and having a second digital output; and
- at least one logic gate connected to the first digital output and the second digital output.

20. The inverter system of claim 16 wherein:
- the temperature measurement circuit comprises a thermistor;
- the voltage measurement circuit comprises a low pass filter and buffer; and
- the second current measurement circuit comprises a second current transducer.

* * * * *